(12) United States Patent
Yoo et al.

(10) Patent No.: US 12,386,512 B2
(45) Date of Patent: Aug. 12, 2025

(54) ULTRAHIGH-BANDWIDTH LOW-LATENCY RECONFIGURABLE MEMORY INTERCONNECTS BY WAVELENGTH ROUTING

(71) Applicant: The Regents of the University of California, Oakland, CA (US)

(72) Inventors: Sung-Joo Ben Yoo, Davis, CA (US); Marjan Fariborz, Davis, CA (US); Pouya Fotouhi, San Jose, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/505,521

(22) PCT Filed: May 18, 2022

(86) PCT No.: PCT/US2022/029776
§ 371 (c)(1),
(2) Date: Nov. 9, 2023

(87) PCT Pub. No.: WO2022/265796
PCT Pub. Date: Dec. 22, 2022

(65) Prior Publication Data
US 2025/0085856 A1 Mar. 13, 2025

Related U.S. Application Data

(60) Provisional application No. 63/190,632, filed on May 19, 2021.

(51) Int. Cl.
G06F 3/06 (2006.01)
G02B 6/42 (2006.01)
H04B 10/80 (2013.01)

(52) U.S. Cl.
CPC .......... *G06F 3/0611* (2013.01); *G02B 6/4246* (2013.01); *G06F 3/0659* (2013.01); *G06F 3/0673* (2013.01); *H04B 10/801* (2013.01)

(58) Field of Classification Search
None
See application file for complete search history.

(56) References Cited

U.S. PATENT DOCUMENTS

2004/0257890 A1   12/2004   Lee et al.
2012/0203957 A1    8/2012   Schuette
(Continued)

*Primary Examiner* — Scott C Sun
(74) *Attorney, Agent, or Firm* — Park, Vaughan, Fleming & Dowler LLP

(57) ABSTRACT

One embodiment provides a computer system. The computer system includes a plurality of processing units, a plurality of memory channels, and an arrayed waveguide grating router (AWGR). A respective processing unit is coupled to an array of tunable optical transceivers. A respective memory channel is coupled to a plurality of memory banks. Each memory bank is associated with a unique optical wavelength and can be accessed via the corresponding wavelength. Each memory channel is coupled to an individual output port of the AWGR, and the tunable optical transceivers of each processing unit are respectively coupled to different input ports of the AWGR, thereby allowing each processing unit to communicate with any memory bank associated with any memory channel using an appropriate tunable optical transceiver tuned to the corresponding optical wavelength associated with the memory bank.

20 Claims, 10 Drawing Sheets

(56) References Cited

U.S. PATENT DOCUMENTS

2014/0255022 A1* 9/2014 Zhong ............... H04Q 11/0066
398/16
2020/0387402 A1 12/2020 Monteiro Soares et al.

* cited by examiner

ULTRAHIGH-BANDWIDTH LOW-LATENCY RECONFIGURABLE MEMORY INTERCONNECTS BY WAVELENGTH ROUTING

CROSS-REFERENCE TO RELATED APPLICATION

This application claims priority under 35 U.S.C. § 119 (e) to U.S. Provisional Application Ser. No. 63/190,632, entitled "Ultrahigh-Bandwidth Low-Latency Reconfigurable Memory" by inventor Sung-Joo Ben Yoo, filed on 19 May 2021, the disclosure of which is incorporated herein by reference in its entirety.

GOVERNMENT FUNDING

This invention was made with U.S. government support under grant number W911NF1910470 awarded by the United States Army Research Office. The U.S. government has certain rights in the invention.

BACKGROUND

Field

The disclosed embodiments generally relate to memory systems and architecture. More specifically, the disclosed embodiments relate to achieving low-latency memory (LLM) using Wavelength Division Multiplexing (WDM)-based optical interconnects.

Related Art

Applications with irregular memory-access patterns demand not only high bandwidth but also low latency from memory subsystems. In addition, low variability in memory latency is also desirable to ensure high performance for irregular applications. Although recent advances in Dynamic Random Access Memory (DRAM) and High Bandwidth Memory (HBM) technologies provide improvements to the memory bandwidth, these bandwidth improvements often come at the expense of additional latency and variability in memory-access time due to deeper queues in the memory controller.

The main source of latency for irregular workloads in the memory subsystem is contention caused by sharing resources (e.g., buffers, ports, data/command/control buses, and the DRAM cells). Increasing these resources comes at a significant cost and may have physical limits, such as the number of pins (I/O pads) that can be placed in a given space. Thus, one may need to consider sources of contention in the entire end-to-end path, which includes the processor-memory interconnect, memory controller, and DRAM microarchitecture. Chiplet-based processor architectures can provide the opportunity to codesign the off-chip (let) processor-memory interconnect, memory controller, and the DRAM microarchitecture, thereby making end-to-end optimization of the memory subsystem feasible.

SUMMARY

One embodiment provides a computer system. The computer system includes a plurality of processing units, a plurality of memory channels, and an arrayed waveguide grating router (AWGR). A respective processing unit is coupled to an array of tunable optical transceivers. A respective memory channel is coupled to a plurality of memory banks. Each memory bank is associated with a unique optical wavelength and can be accessed via the corresponding optical wavelength. The AWGR couples the tunable optical transceivers and the memory channels. Each memory channel is coupled to an individual output port of the AWGR, and the tunable optical transceivers of each processing unit are respectively coupled to different input ports of the AWGR, thereby allowing each processing unit to communicate with any memory bank associated with any memory channel using an appropriate tunable optical transceiver tuned to the corresponding optical wavelength associated with the memory bank.

In a variation on this embodiment, the computer system further includes a memory controller configured to coordinate communication between the processing units and memory banks associated with the memory channel. The memory controller includes a plurality of processor-specific command queues, and a respective processor-specific command queue is configured to queue memory-access commands from a corresponding processing unit.

In a further variation, the memory controller further includes arbitration circuitry configured to select, from the processor-specific command queues, a memory-access command to be serviced.

In a further variation, the selected memory-access command specifies a memory channel address and a memory bank address. The memory channel address indicates an AWGR port to which the memory channel is coupled, and the memory bank address indicates a wavelength by which the memory bank can be accessed.

In a further variation, the arbitration circuitry is further configured to send an acknowledgment message to the processing unit for which the memory-access command is selected, and the processing unit is configured to select the transceiver and wavelength based on the memory channel address and memory bank address associated with the memory-access command.

In a further variation, the processing unit is further configured to tune the determined transceiver to the selected wavelength and access a memory bank corresponding to the selected memory-access command using the tuned transceiver.

In a variation on this embodiment, the computer system further includes an electrical interconnect coupling the processing units and memory controllers for the memory channels.

In a variation on this embodiment, the array of tunable optical transceivers comprises a comb generator and an array of microring resonators.

In a variation on this embodiment, each memory bank includes an optical transceiver operating at the corresponding optical wavelength.

In a variation on this embodiment, each memory bank further includes at least two sub-banks, thereby further improving memory-access parallelism.

In a variation on this embodiment, the processing units are stacked to form a multi-processor stack comprising multiple processor layers, wherein transceivers associated with multiple processor layers are coupled to a same port of the AWGR using a through-silicon optical via (TSOV).

In a variation on this embodiment, the memory channels are coupled to memory dies that are stacked and interconnected using TSOVs and through-silicon-vias (TSVs).

In a variation on this embodiment, the processing units, the memory channels, and the AWGR are packaged on a common substrate.

One embodiment provides a memory-access method. The method includes sending, by a processing unit, a memory-access command to a memory-control-plane interconnect coupling a plurality of processing units and a plurality of memory banks. Multiple memory banks can be coupled to a memory channel. Each memory bank is associated with an accessible via an optical signal transmitted on the corresponding memory channel at a unique optical wavelength. The memory-access command specifies a memory channel address and a memory bank address of a target memory bank, thereby allowing the memory-control-plane interconnect to forward the memory-access command to a memory controller associated with the target memory bank. The method includes selecting, by the processing unit from an array of tunable optical transceivers coupled to the processing unit, a tunable optical transceiver based on the memory channel address and the memory bank address. The array of tunable optical transceivers are respectively coupled to different input ports of an arrayed waveguide grating router (AWGR), and different output ports of the AWGR are coupled to different memory channels. The method further includes tuning the selected tunable optical transceiver to a wavelength corresponding to the target memory bank and communicating with the target memory bank using the tuned optical transceiver via the AWGR.

In a variation on this embodiment, the memory-control-plane interconnect comprises an electrical interconnect.

In a variation on this embodiment, the method further includes queuing, at the memory controller, the memory-access command in a processor-specific queue.

In a further variation, the method further includes performing, by the memory controller, arbitration among multiple processor-specific queues to select the memory-access command for service.

In a variation on this embodiment, tuning the determined tunable optical transceiver comprises tuning a corresponding microring resonator.

In a further variation, the method further includes delaying, by the memory controller, activation of a requested row in the target memory bank to provide the tunable optical transceiver sufficient time to tune the microring resonator.

BRIEF DESCRIPTION OF THE FIGURES

In the figures, like reference numerals refer to the same figure elements.

DETAILED DESCRIPTION

Figure 1:
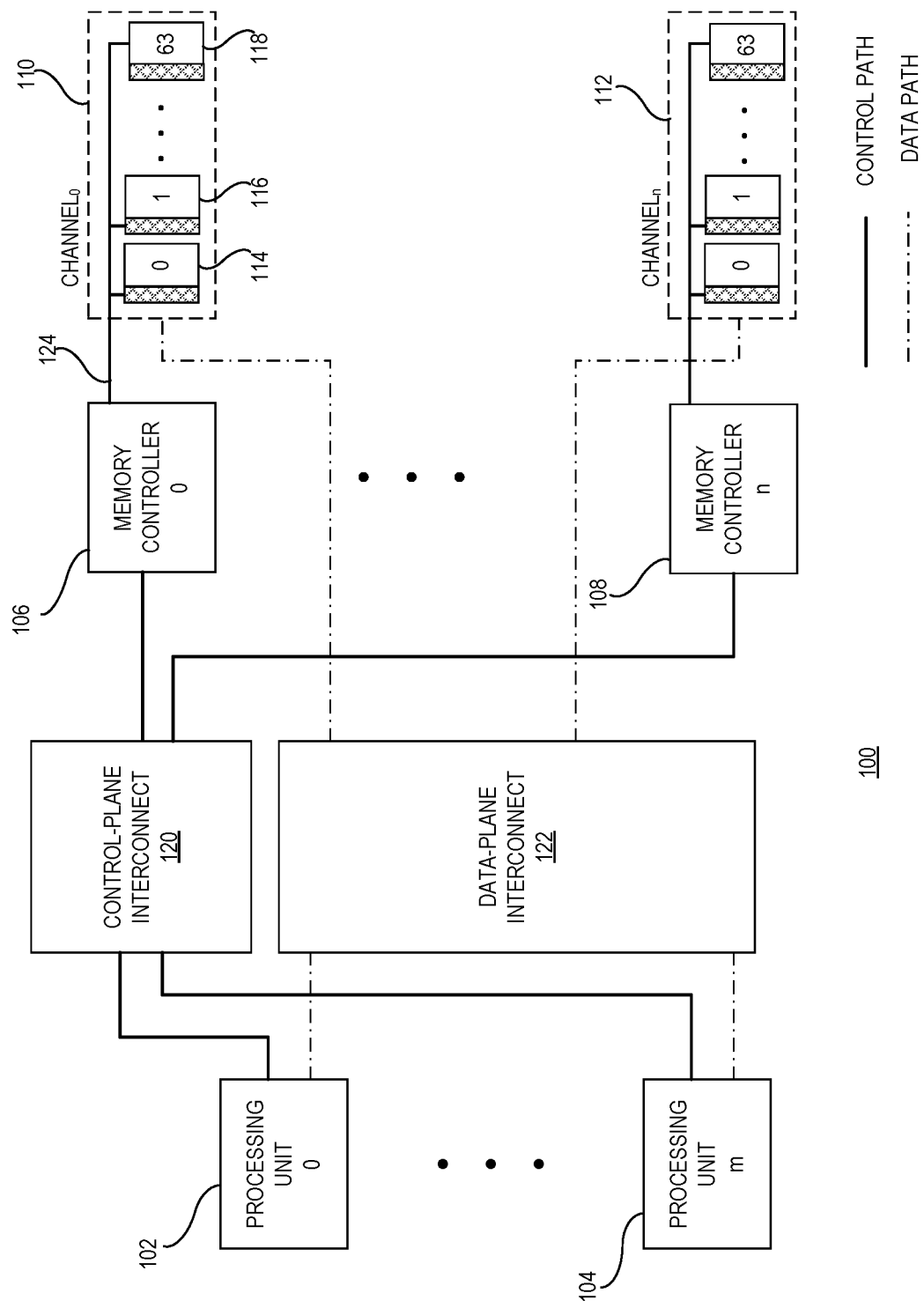
FIG. 1 illustrates the exemplary low-latency memory (LLM) system, according to one embodiment.

The following description is presented to enable any person skilled in the art to make and use the present embodiments and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown but are to be accorded the widest scope consistent with the principles and features disclosed herein.

Overview

The disclosed embodiments provide a low-latency memory (LLM) architecture that can simultaneously optimize latency, bandwidth, and energy efficiency by taking advantage of silicon photonic (SiPh) interconnects with optical parallelism and wavelength routing to reduce contention in the entire path from the processor to the memory subarrays. The LLM architecture can include three pieces: a contention-less optical data plane, a low-bandwidth electrical control plane, and fine-grained memory banks with integrated photonics. In the data plane, the arrayed wavelength grating router (AWGR)-based optical interconnect can provide a dedicated data path from every requester to every memory bank, with no intermediate buffering, to reduce the queuing and interconnect latency. In the control plane, a low-bandwidth electrical or optical interconnect can communicate the addresses and commands between processors and memory and coordinate the time that a processor sends or receives data. The fine-grained memory banks (also referred to as microbanks) can be directly accessed by the memory controller to allow for massive amounts of parallelism.

LLM Architecture

Chiplet-based computer architecture typically can include four major components: the interconnect fabric between the chiplets (i.e., processors) and the memory controller, the memory controller, the data buses between the memory controller and memory devices (e.g., DRAMs), and the memory devices. In conventional memory subsystems, the processor-memory interconnect fabric typically implements a complex crossbar structure, and the memory controller can include queues for buffering read/write requests. In these conventional memory subsystems, the interconnect fabric, the queues inside the memory controllers, data buses within each memory channel, and certain components within a memory device (e.g., global sense amplifiers and global bitlines within a DRAM) are shared, which introduces the potential for contention and additional latency due to arbitration, buffering, and serialization (time multiplexed sharing). Although increasing the quantity of the shared resources can reduce the queuing latency at the memory controller, reduction in the device and interconnect latency can be much harder to achieve. By using a ground up codesign of the entire end-to-end path from the processor-memory interconnect to the DRAM microarchitecture, embodiments of the present invention provide improvements to both bandwidth and latency without sacrificing one for another.

FIG. 1 illustrates the exemplary low-latency memory (LLM) system, according to one embodiment. LLM system 100 can include a number of processing units (e.g., processing units 102 and 104), a number of memory controllers (e.g., memory controllers 106 and 108), a number of memory banks organized into a number of memory channels (e.g., memory channels 110 and 112), a control-plane interconnect 120 coupling the processing units and the memory controllers, and a data-plane interconnect 122 coupling the processing units and the memory channels.

The processing units can include chiplets or conventional single-chip processors. In the control plane, the processing units are coupled to memory controllers via control-plane interconnect 120. Due to the small size of the control packets, control-plane interconnect 120 can be a low-bandwidth all-to-all interconnect, such as an electrical interconnect that can provide sufficient bandwidth for the communication of command and address bits. It is also possible for control-plane interconnect 120 to include an optical interconnect. Control-plane interconnect 120 can be used to manage bank conflicts and coordinate movement of data.

Each memory controller is coupled to a memory channel associated with a number of memory banks. In some embodiments, a memory channel can refer to a standalone DRAM chip/die or multiple co-packaged DRAM chips/dies. For example, memory controller 106 is coupled to memory channel 110, which is associated with a plurality of memory banks (e.g., banks 114, 116, and 118). The memory banks in each memory channel (e.g., banks 114-118 in channel 110) can be smaller than conventional memory banks (e.g., HBM memory banks) and can be referred to as microbanks in this disclosure. Note that each microbank can be further divided into sub-microbanks to reduce the activation energy to allow for more parallel accesses. A memory controller receives memory requests from and sends handshake signals to the processing units via control-plane interconnect 120 and communicates with (e.g., sends data to or receives data from) each coupled microbank via a dedicated data bus. For example, memory controller 106 communicates with microbanks 114-118 via a data bus 124.

In the data plane, the processing units are coupled to memory channels (or microbanks in each channel) via data-plane interconnect 122. In some embodiments, data-plane interconnect 122 includes an optical interconnect to take advantage of the lower energy consumption and the higher bandwidth density provided by the optical interconnect. In further embodiments, data-plane interconnect 122 can include an AWGR that can provide all-to-all connections between the requesters (i.e., the processing units on the processor side) and the responders (i.e., the microbanks on the memory side). An AWGR is a passive silicon photonic device with a compact layout that offers scalable all-to-all connectivity through wavelength routing. In the LLM implementation, AWGR-based data-plane interconnect 122 can allow connections from any requester to any microbank. In some embodiments, AWGR-based data-plane interconnect 122 can have a footprint of less than 1 mm, a crosstalk of less than −38 dB, and an insertion loss of less than 2 dB.

Figure 2:
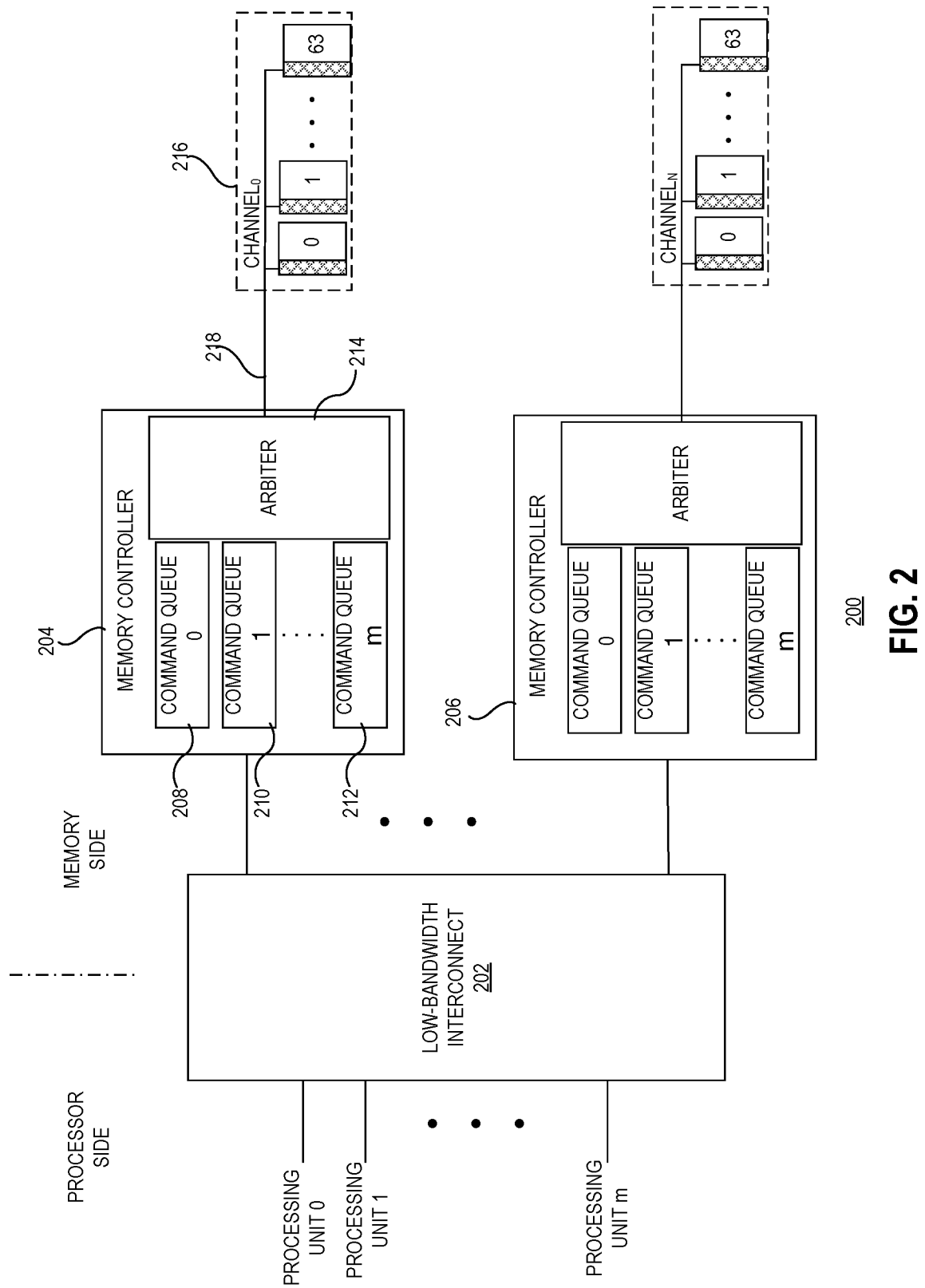
FIG. 2 illustrates the control plane of the LLM system, according to one embodiment.

FIG. 2 illustrates the control plane of the LLM system, according to one embodiment. The control plane of LLM system 200 can include low-bandwidth interconnect 202 coupling the processing units on the processor side and the memory controllers (e.g., memory controllers 204 and 206) on the memory side.

A conventional memory controller can include one or more queues (often organized based on priority) for buffering read/write requests from all requesters, and a bursty requester can overload the entire queue structure, forcing other requesters to stall. To avoid this problem, each memory controller (e.g., controller 204 or 206) in LLM system 200 can be redesigned to have a single-entry queue per requester. Note that a requester can be a single processing unit or a group of processing units. The redesigned memory controller can accomplish a number of tasks, including issuing requests at a high rate to increase throughput, managing arbitration in case of memory bank conflicts, and coordinating between requests and data signals.

FIG. 2 shows that memory controller 204 includes a number of command queues, such as command queues 208, 210, and 212, and an arbiter 214. The command queues are single-entry queues, meaning that each queue only accepts commands from a particular requester. The number of command queues in each memory controller equals the number of requesters coupled to that memory controller. These single-entry command queues only store the command signals (which can be electrical signals if low-bandwidth interconnect 202 includes electrical interconnects), and the data is buffered at the requesters. Arbiter 214 includes circuitry for performing arbitration and can be responsible for selecting a request to be sent to a free microbank coupled to memory controller 204 (e.g., microbanks in channel 216). In some embodiments, arbiter 214 can implement a round-robin arbitration algorithm to select an available request from one queue to a free memory bank.

When there is a cache miss or write-back targeting memory channel 216, a requester sends a request to memory controller 204, and the request can be queued in the command queue for that requester. At each cycle, arbiter 214 selects a request from one of the command queues (e.g., command queues 208-212). For a read request, memory controller 204 asserts the appropriate command and address on data bus 218. At the same time, arbiter 214 sends a notification back to the requester to inform the requester when the data will appear on the dedicated data bus for that microbank, allowing the requester to set its wavelength accordingly. In some embodiments, each requester (e.g., processing unit) can be equipped with or coupled to microring resonators (e.g., electro-optically tunable microrings with a tuning speed of a few nanoseconds) that can be tuned to specific wavelengths. During read, the requester can tune its receiving wavelength (i.e., the microring of the receiver) while the to-be-read memory row is activated. The receiver microring at the requester should have been tuned to the corresponding wavelength once the memory row is activated. To ensure the readiness at the requester, the memory controller can delay the activation request by a certain amount of time (e.g., the time needed for the requester to tune its microring). In some embodiments, the memory controller delays the activation request by a guard time of 10 ns.

Figure 3A:
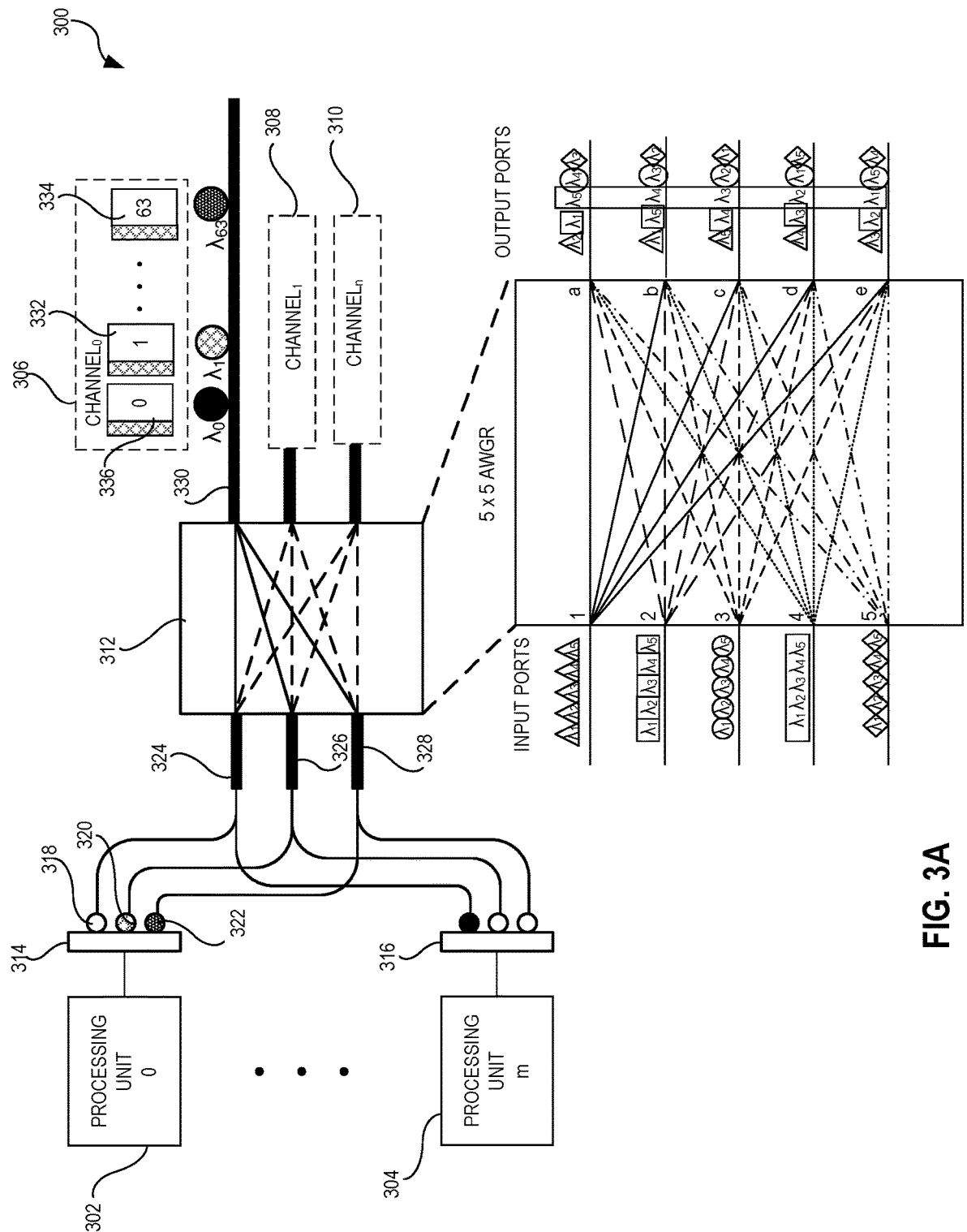
FIG. 3A illustrates the exemplary data plane of the low-latency memory (LLM) system, according to one embodiment.

FIG. 3A illustrates the exemplary data plane of the low-latency memory (LLM) system, according to one embodiment. The data plane of LLM system 300 can include a number of processing units (e.g., processing units 302 and 304) on the processor side, a number of memory channels (e.g., memory channels 306, 308, and 310) on the memory side, and an optical interconnect 312 coupling the processing units and the memory channels.

Processing units 302 and 304 can be similar to processing units 102 and 104 shown in FIG. 1. Each processing unit can include an optical interface comprising a plurality of optical transceivers. For example, processing unit 302 includes an optical interface 314, and processing unit 304 includes an optical interface 316. Each optical interface can include an array of microring resonators to allow the processing unit to communicate with the memory banks (e.g., reading/writing data) using optical signals of particular wavelengths. In some embodiments, the microring resonators can be tunable, such that each processing unit can include one tunable microring per channel. For example, if there are n memory channels, each processing unit can include n tunable microrings.

Each memory channel corresponds to a memory controller and can include a number of memory banks (or microbanks in the context of LLM). For example, channel 306 includes 64 microbanks, including microbanks 332, 334, and 336. Optical interconnect 312 can facilitate all-to-all connections between the processing units and the memory microbanks in all channels. In other words, a processing unit can be connected (e.g., can issue read/write requests) to any microbank within any channel. In some embodiments, optical interconnect 312 includes an AWGR (e.g., an n×n AWGR, with n being the number of memory channels/banks per channel).

FIG. 3A shows that each memory channel is connected to an AWGR port using a waveguide. For example, channel 306 is connected to AWGR port 330 using a waveguide. The waveguide can carry multiple wavelengths, one wavelength for each microbank in the channel. Within each channel, each microbank also includes an optical interface (e.g., an optical transceiver) with a microring resonator tuned to a specific wavelength. The microring allows the microbank to modulate/demodulate data on the waveguide. In the example shown in FIG. 3A, each channel is coupled to one waveguide. In practice, to enable simultaneous reads and writes, each channel can be assigned with two waveguides to connect to two separate AWGRs (one for data read operations and the other for data write operations). In alternative embodiments, the wavelengths supported by the AWGR can be divided into two groups, with one group for the read operations and the other group for the write operations. For example, the 64 wavelengths (e.g., $\lambda_1, \lambda_2, \ldots \lambda_{63}$) supported by a 64×64 AWGR can be divided into two groups with each group having 32 wavelengths, with $\lambda_0, \lambda_1 \ldots \lambda_{31}$ used for the write operations and $\lambda_{32}, \lambda_{33} \ldots \lambda_{63}$ used for the read operations.

In order to be connected to a destination microbank (which is connected to a particular AWGR port and has its microring tuned to a particular wavelength), a requester should be able to tune one of its own microrings to that particular wavelength. In some embodiments, each requester is equipped with an array of microrings, with different microrings coupled to different AWGR ports (e.g., via different waveguides) to allow the requester to connect to all channels. In the example shown in FIG. 3A, microrings 318, 320, and 322 of processing unit 302 are connected to input ports 324, 326, and 328, respectively, of optical interconnect or AWGR 312. This results in each AWGR input port being coupled to one microring from every requester (i.e., processing unit). If there are m processing units coupled to AWGR 312, each AWGR input port will be coupled to m microrings.

The wavelength routing property of the AWGR ensures that signals of different wavelengths coupled to one input port are routed to different output ports, and that signals of the same wavelength coupled to different input ports are also routed to different output ports. FIG. 3A shows, at its lower right corner, the routing map of an exemplary 5×5 AWGR. When a requester requests (reads or writes) a particular microbank in a particular channel, the microbank address specified by the request indicates the wavelength, and the channel address indicates which microring on which waveguide (or coupled to which AWGR port) should be tuned to that wavelength. For example, when processing unit 302 requests microbank 332 in channel 306, because the microbank address of microbank 332 is "1." processing unit 302 should use wavelength $\lambda_1$ to communicate with microbank 332. Moreover, the channel address of channel 306 (i.e., "0") indicates that processing unit 302 should tune microring 320 coupled to AWGR port 326 to $\lambda_1$ such that the signal can be routed to the waveguide (or to AWGR port 330) coupled to channel 306. On the other hand, to communicate with microbank 334 (which has a microbank address "63") in channel 306, processing unit 302 should tune microring 322 coupled to AWGR port 328 to $\lambda_{63}$. The coupling arrangements between the microring arrays and the AWGR ports on both the processor side and the memory side allow each single requester to send requests to every microbank within each channel using a different wavelength on each of the waveguides connected to different input ports of the AWGR; this coupling arrangements also allows all requesters to send, at a particular time, requests to different channels using different wavelengths on a single waveguide connected to a single AWGR port. For example, each of processing units 302 and 304 may send requests to all microbanks in channel 306 using different wavelengths at each AWGR port (including AWGR ports 324-328), and processing units 302 and 304 together may send requests to different channels (e.g., channels 306-310) over AWGR port 324 using different wavelengths. At a given time, any combination of the above situations may occur. The only possible contentions are caused by bank conflict, which can be resolved at the memory controllers using an arbitration algorithm (e.g., the round-robin algorithm).

Figure 3B:
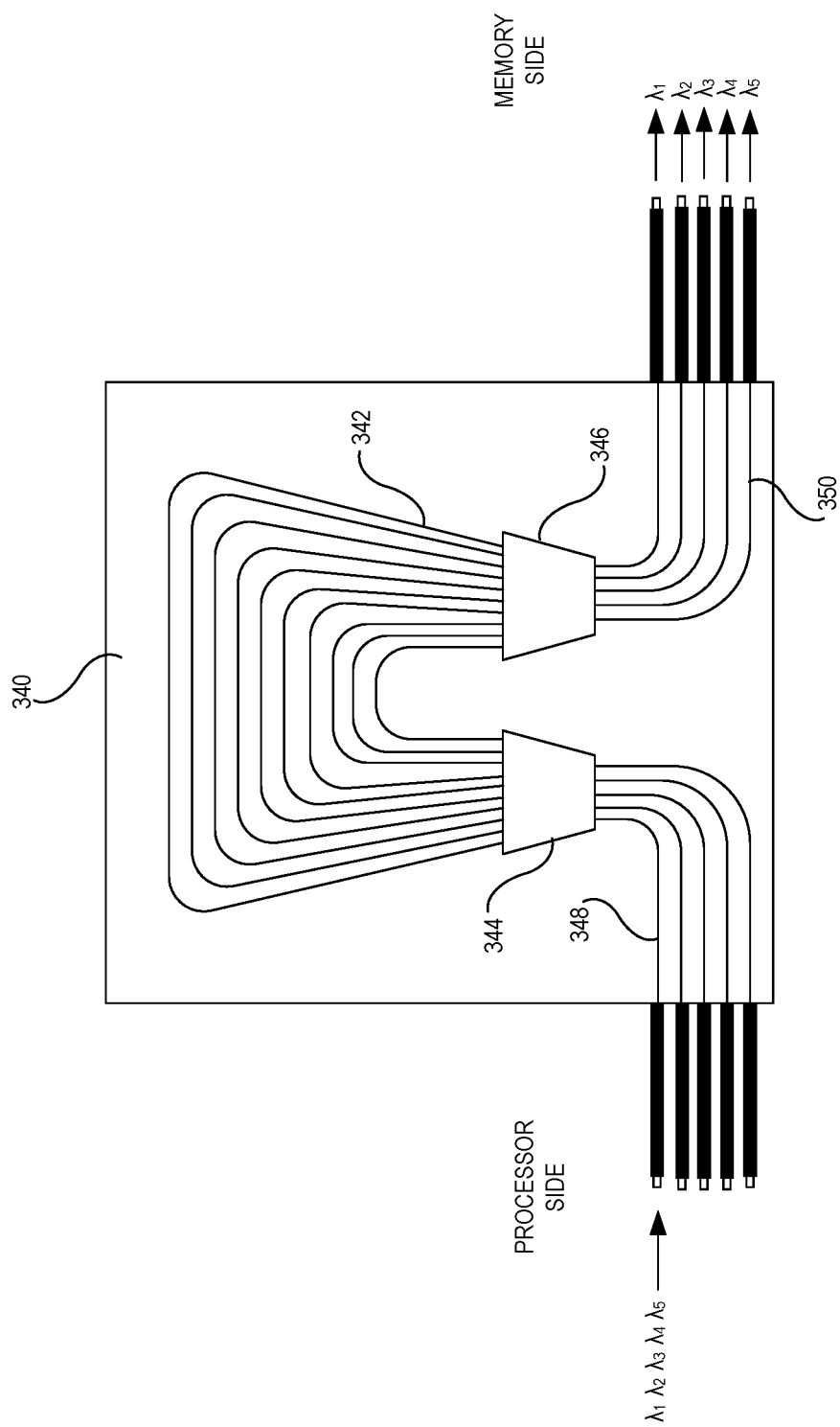
FIG. 3B illustrates the schematic of an exemplary AWGR, according to one embodiment.

FIG. 3B illustrates the schematic of an exemplary AWGR, according to one embodiment. AWGR 340 can include a number of arrayed waveguides (e.g., arrayed waveguide 342), an input slab waveguide 344, an output slab waveguide 346, a number of input waveguides (e.g., input waveguide 348), and a number of output waveguides (e.g., output waveguide 350). In some embodiments, AWGR 340 can be fabricated using a SiPh technology (e.g., silica-on-silicon). In the example shown in FIG. 3B, the input and output waveguides can be coupled to a number of fibers to facilitate coupling between AWGR 340 and the processing units and the coupling between AWGR 340 and the memory banks. In this example, the processing units are transmitting light and are coupled to the input waveguides of AWGR 340; the memory banks are receiving light and are coupled to the output waveguides of AWGR 340. In a different case, the processing units may also be coupled to the output waveguides of a different AWGR, whereas the input waveguides of the different AWGR can be coupled to the memory banks. As discussed previously, it is possible to have two AWGRs, one for the write operations and one for the read operations. FIG. 3B also shows that optical signals of different wavelengths coupled to a particular input waveguide of AWGR 340 can be routed to the different output waveguides of AWGR 340. The routing map can be similar to the one shown in FIG. 3A.

Various AWGR parameters, such as the number of ports (waveguides), the number of wavelengths per port (per waveguide), and the data rate at the port (waveguide), can determine the scale of the memory system, including the number of requesters, the number of memory channels, the number of microbanks per memory channel, and the bandwidth of each microbank. An n×n AWGR interconnects n memory channels and n requesters (or group of requesters). Each requester can be connected to n microrings using n wavelengths. The scalability of the system depends on the scalability of the AWGR. In one embodiment, the AWGR can include 64 or 128 ports. In a further embodiment, multiple smaller AWGRs (e.g., AWGRs with lower port counts) can be coupled in parallel to each other to provide all-to-all interconnections between the processors and the microbanks as a large AWGR.

Figure 4A:
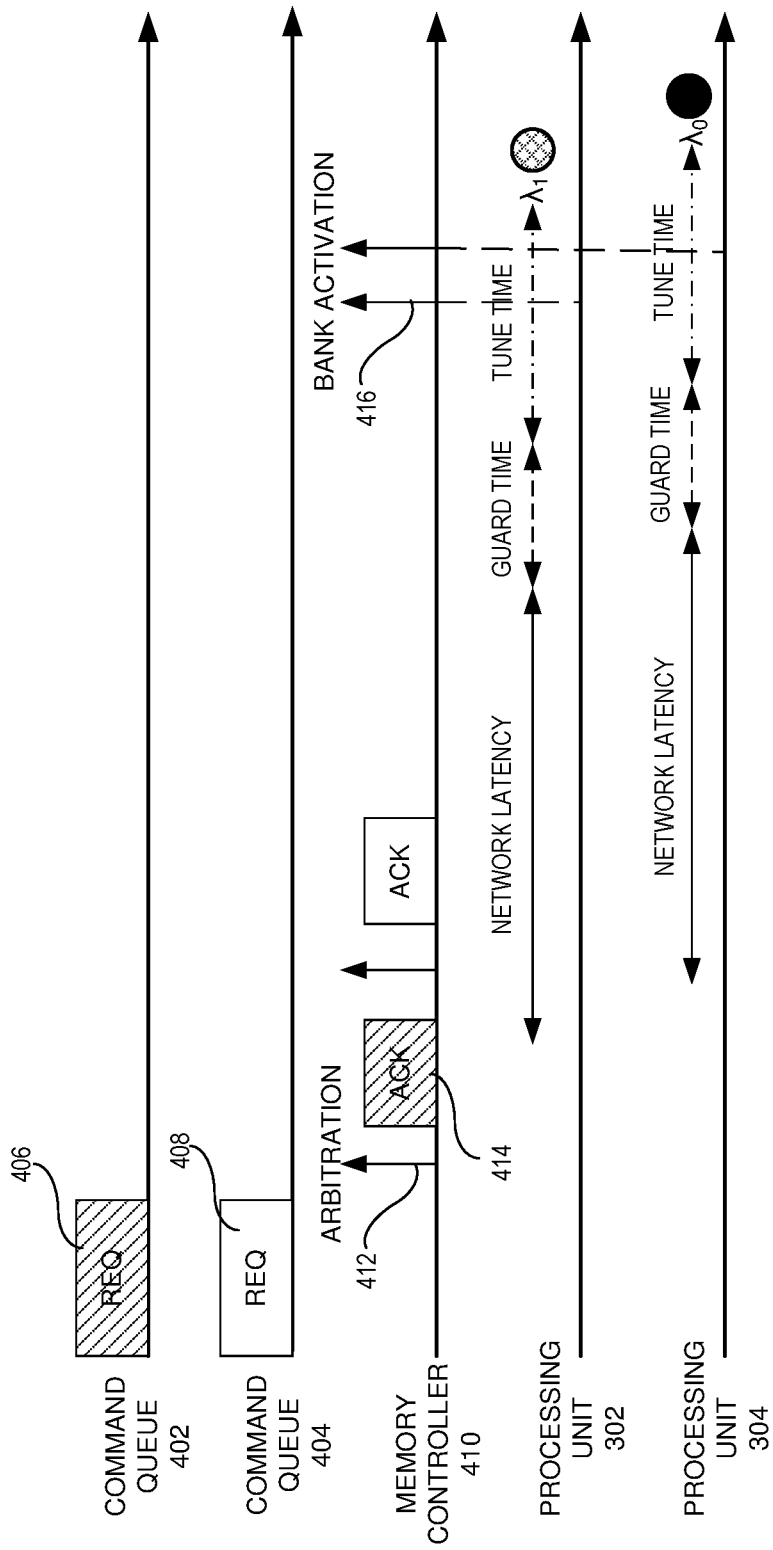
FIG. 4A illustrates the timing sequence for exemplary memory-access operations, according to one embodiment.

In the example shown in FIG. 3A, processing units 302 and 304 may access different microbanks in channel 306 through AWGR ports 324, 326, and 328 using different wavelengths (e.g., $\lambda_0$, $\lambda_1$, and $\lambda_{63}$). Note that the hollow circles in optical interfaces 314 and 316 represent microrings that are not yet activated (meaning that they are not tuned to any particular wavelength). FIG. 4A illustrates the timing sequence for the exemplary memory-access operations shown in FIG. 3A, according to one embodiment. The following description refers to both FIG. 3A and FIG. 4A. In this example, multiple processing units (e.g., processing units 302 and 304) are performing write operations, and the command queues (e.g., command queues 402 and 404) in a memory controller for a channel may include queued requests (e.g., requests 406 and 408) from different processing units. When request 406 from processing unit 302 is selected by the arbiter in memory controller 410 of channel 306 (i.e., arbitration event 412), memory controller 410 sends an acknowledgment signal 414 to processing unit 302. In response to receiving acknowledgment signal 414, processing unit 302 prepares to send data to the memory. In this example, the destination of request 406 is microbank 332 (with a microbank address "1") in channel 306, which operates in $\lambda_1$. After memory controller 410 issues a request to memory, data will be ready in the memory after a predetermined time interval (which is determined by the memory-access latency). More specifically, data will be ready after bank-activation event 416, which can be delayed by memory controller by using a predetermined guard time. This delay provides processing unit 302 time to tune the correct microring (the channel and microbank addresses indicate which microring must be tuned to which wavelength). In this example, processing unit 302 tunes microring 320 to wavelength $\lambda_1$. A number of delays (including the network latency, a necessary guard time (which delays the activation request), the time needed to tune the microring) may occur before the corresponding microring is tuned to the desired wavelength. Therefore, the memory device needs to have a deterministic response time. In some embodiments, the LLM system uses a closed-page policy, where the memory row buffer is closed immediately after every read or write. In addition to request 406 issued by processing unit 302, FIG. 4A also shows that processing unit 304 may issue request 408 for reaching microbank 336 in channel 306, which operates in $\lambda_0$. Accordingly, processing unit 304 can similarly tune one of its microrings to $\lambda_0$.

Figure 4B:
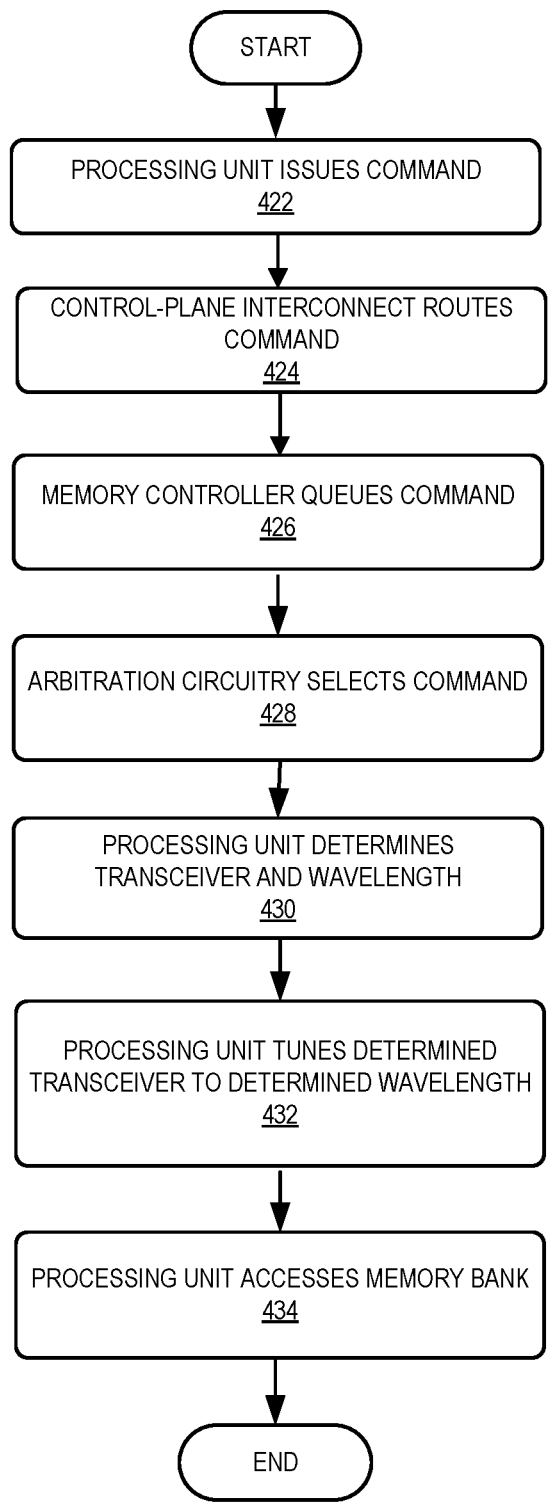
FIG. 4B presents a flowchart illustrating an exemplary memory-access operation, according to one embodiment.

FIG. 4B presents a flowchart illustrating an exemplary memory-access operation, according to one embodiment. During operation, a processing unit issues a memory-access command (operation 422). The command may target a particular memory bank within a particular memory channel. In some embodiments, the command may specify a channel address and a microbank address. The low-bandwidth control-plane interconnect routes the memory-access command to a memory controller for that particular memory channel (operation 424). The low-bandwidth control-plane interconnect can route the command based on the channel address specified by the command. The memory controller queues the command in a command queue specific to the sending processing unit (operation 426). The arbitration circuitry in the memory controller selects the command for service and sends an acknowledgment message back to the sending processing unit (operation 428). Upon receiving the acknowledgment, the processing unit may determine, based on the channel address and the microbank address, which tunable transceiver (i.e., microring) from the array of transceivers coupled to the AWGR ports to tune to which wavelength (operation 430). The processing unit can tune the determined transceiver to the determined wavelength (operation 432) and subsequently access the particular memory bank in the particular channel using the tuned transceiver (operation 434). For a read operation, the processing unit can receive data from the AWGR port corresponding to the transceiver at the particular wavelength; for a write operation, the processing unit can transmit data to the corresponding AWGR port using the particular wavelength.

In the example shown in FIGS. 3A-4B, there is no bank conflict. In practice, a bank conflict may occur when multiple consecutive requests target different rows in the same microbank. Bank conflicts can cause long latency, especially for irregular workloads due to their random memory access pattern. By using microbanks that are smaller than the HBM banks, LLM can reduce the probability of bank conflict. In both HBM and LLM, groups of DRAM cells are combined into "mats," which are planar 2D arrays of 512×512 DRAM cells. Mats inside of a subarray are connected to a local sense amplifier, and a global bitline connects local sense amplifiers to a global sense amplifier. In LLM microbanks, both the number and size of the subarrays are twice as small as the HBM banks. The smaller number of subarrays in the LLM microbanks results in shorter global bitlines compared with HBM since each microbank is physically smaller than an HBM bank. In some embodiments, each microbank can be split into two sub-microbanks in order to reduce the size of the row buffer.

Figure 5:
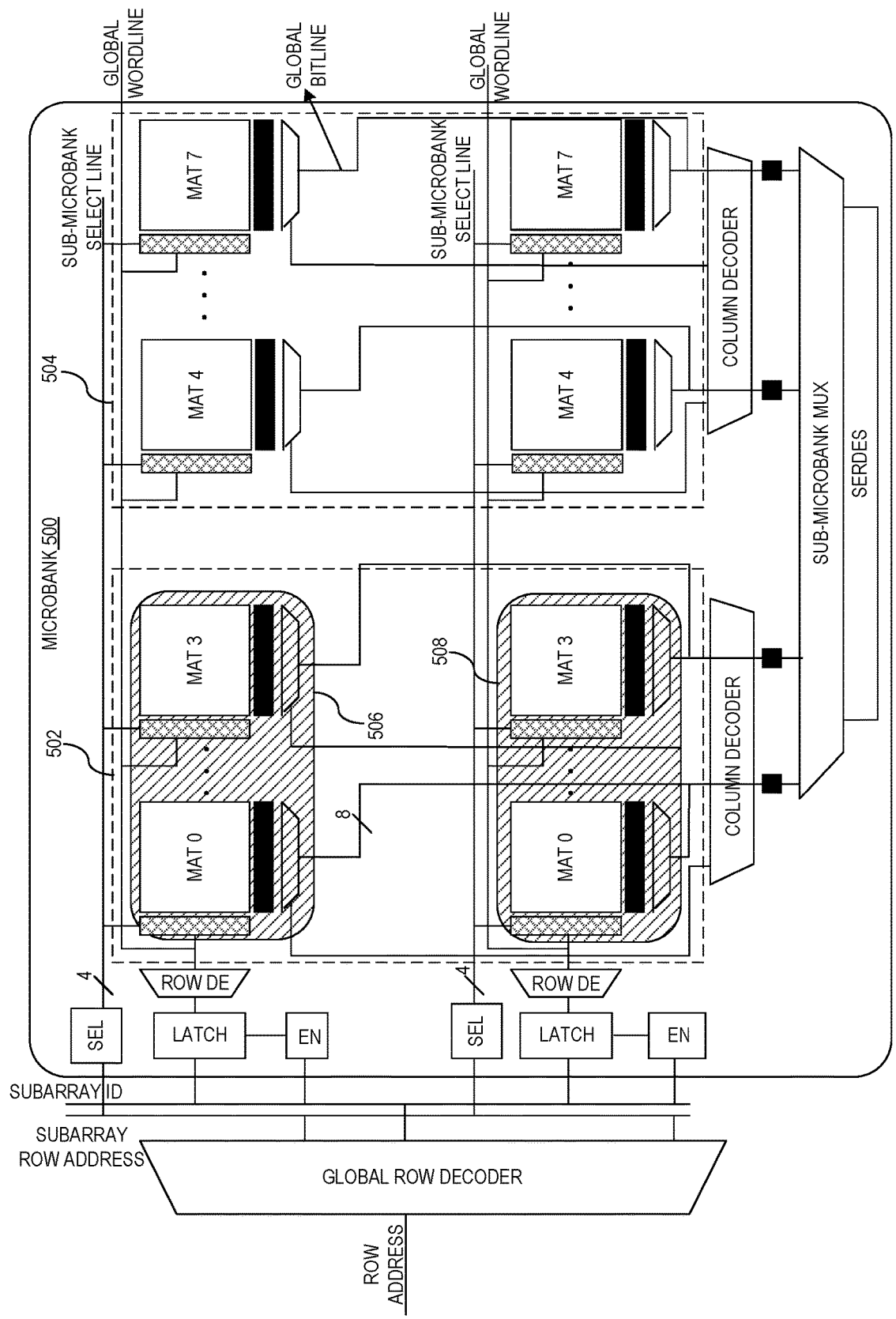
FIG. 5 illustrates the exemplary microbank architecture with one microbank split into two sub-microbanks, according to one embodiment.

FIG. 5 illustrates the exemplary microbank architecture with one microbank split into two sub-microbanks, according to one embodiment. In FIG. 5, a microbank 500 has a 2D array of mats, with each mat including a 2D array of 512×512 DRAM cells. The 2D array of mats is split into two sub-microbanks (i.e., sub-microbank 502 and 504), and each sub-microbank can include a number of subarrays. For example, sub-microbank 502 can include subarrays 506 and 508. Each sub-microbank can have its own global row buffer but share the same data bus. Each sub-microbank having a dedicated row buffer reduces the size of the buffer. Moreover, as can be seen from FIG. 5, the size of the subarray is cut in half in each sub-microbank, which can result in shorter global bitlines. The shorter bitlines can in turn reduce the activation energy, thus allowing for more parallel accesses. Studies have shown that the activation row size directly affects the DRAM activation energy. Compared with HBM, LLM has smaller microbanks and sub-microbanks, and the activation row size and the activation energy are reduced by 75%.

In addition to bank conflicts, the data bus shared by multiple banks within the same channel may also cause contention. In conventional memory systems, this contention can be removed by separating requests targeting different banks in a memory channel by a time interval (e.g., $t_{BURST}$). Because the LLM system assigns a dedicated optical wavelength to each microbank, the contention on the shared data bus can be removed. In the LLM system, each microbank uses a SERDES and a microring to communicate data.

The microarchitectural changes in the memory can also affect other timing constraints, such as the time between the column command and the appearance of the data at the memory interface I/O. The data movement latency within the memory die can include pre-global sense amplifier (GSA) latency and post-GSA latency. Splitting the microbank into two sub-microbanks can reduce the length of the global bitline by half, thus lowering the capacitance, which in turn reduces the pre-GSA latency by half. The post-GSA latency can be in the nanosecond range, since the microbanks send data to the I/O through optical wavelengths. The latency caused by the electrical-to-optical and optical-to-electrical conventions can be in the range of tens of nanoseconds.

In a memory (e.g., DRAM), $t_{FAW}$ (Four Active Window) limits the activation rate to limit the drawn current. By reducing the number of activated bits four times, the LLM system can activate four times more rows compared with the HBM system. In the HBM system, $t_{FAW}$ is 12 ns. If the command bus works at a high frequency (e.g., 2 GHZ), the memory controller can issue a maximum of 24 activations, which is lower than the limitation of $t_{FAW}$ in LLM (32 activations). Therefore, the parallelism in LLM channels is not limited by the power delivery constraints.

The timing parameter $t_{BURST}$ indicates the time to transfer the data for a single request on the I/O bus. With 32 Gb/s data bus bandwidth and 64-byte data, $t_{BURST}$ in the LLM is 16 ns. However, since each microbank in the LLM has a dedicated data bus (e.g., dedicated wavelength), increasing (BURST does not affect the requests targeting different microbanks in the same channel. In a system with a shared data bus, the long/BURST increases the serialization effect, forcing all requests going to different banks in each channel to be $t_{BURST}$ apart. The dedicated data bus eliminates the bus contention in the LLM system.

3D Implementation and Packaging

In the LLM system, the memory dies can be organized as either 3D stacks or non-stacked memories. Organizing the memory dies in 3D stacks can increase capacity and bandwidth. Similarly, the processing units can also be organized as a 3D stack. More specifically, processing units can be organized into a 3D structure, which can be referred to as a processing-unit (PU) switch, with each layer being connected to one processing unit and including a number (e.g., n) of tunable transceivers. In some embodiments, the tunable transceivers can be achieved using a comb generator and a plurality of tunable microring resonators. Through-silicon optical vias (TSOVs) or vertical optical-interconnects (VOIs) can be used to couple light between the stacked layers in the memory stack or the processor stack.

Figure 6A:
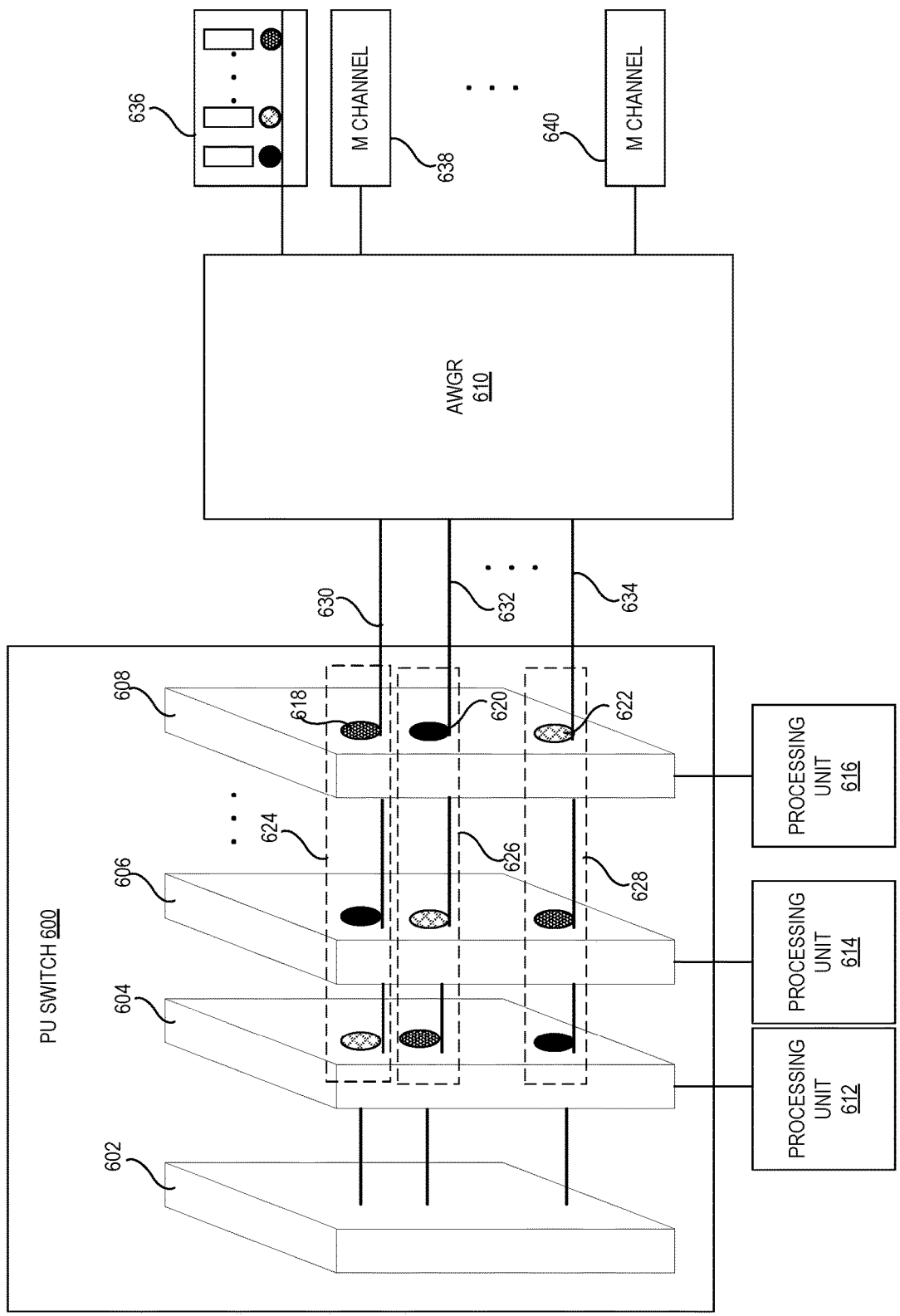
FIG. 6A illustrates an exemplary 3D processing-unit (PU) switch, according to one embodiment.

FIG. 6A illustrates an exemplary 3D processing-unit (PU) switch, according to one embodiment. PU switch 600 can include a logic layer 602 and a number of PU layers (e.g., PU layers 604, 606, and 608). Each PU layer can be coupled to a processing unit and can include an array of tunable transceivers (e.g., microrings). In FIG. 6A, PU layers 604, 606, and 608 are respectively coupled to processing units 612, 614, and 616; PU layer 608 includes a number of microrings (e.g., microrings 618, 620, and 622). In some embodiments, the processing units and the optical transceivers (i.e., microrings) can be integrated on a same substrate. The stacked processors can form a multi-processor 3D stack comprising multiple processor layers and a logic layer, with each processor layer comprising the processing unit (e.g., the processor ASIC) and the embedded transceivers (e.g., the comb generator and microrings). Different microrings from the different PU layers are arranged into a 2D array having multiple rows and column. Microrings within the same column of the 2D array belong to the same PU layer, whereas microrings within the same row belong to different PU layers and can be coupled to the same port of an AWGR 610. In some embodiments, TSOVs can be used to couple microrings in the same row. In FIG. 6A, microrings in rows 624, 626, and 628 are respectively coupled to ports 630, 632, and 634 of AWGR 610. FIG. 6A also shows a number of memory channels (e.g., channels 636, 638, and 640) coupled to AWGR 610, one memory channel per AWGR port. Each memory channel can include multiple memory banks, with each memory bank comprising an optical transceiver (microring) operating at a unique wavelength. Like what is shown in FIG. 3A, by coupling the microrings from different PU layers to the same AWGR port, PU switch 600 can allow the different PU layers to access different memory banks using different wavelengths. Similarly, a PU layer can access all microbanks within a single channel using different wavelengths. In FIG. 6A, PU layer 608 can access all microbanks in channel 636 by tuning microrings 618, 620, and 622 to the different wavelengths corresponding to the microrings of microbanks in channel 636.

Figure 6B:
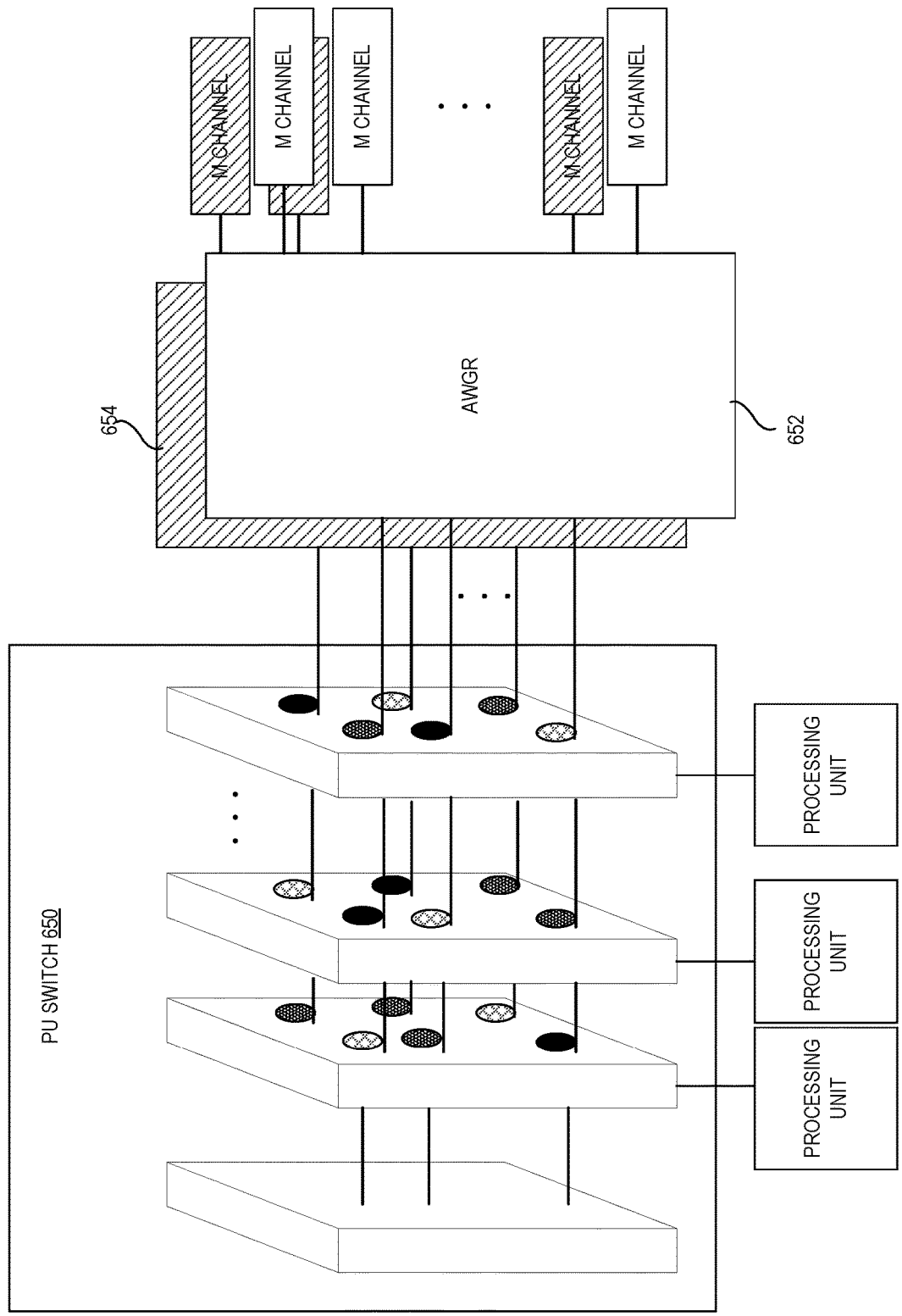
FIG. 6B illustrates an exemplary 3D processing-unit (PU) switch with an increased number of microrings, according to one embodiment.

A large-scale system can use multiple AWGRs to provide connectivity to an increased number of memory channels. In such a case, the number of microrings in each processing unit can be increased accordingly. FIG. 6B illustrates an exemplary 3D processing-unit (PU) switch with an increased number of microrings, according to one embodiment. In the example shown in FIG. 6B, each PU layer of PU switch 650 can include two columns of microrings, with each column being coupled to an AWGR (e.g., AWGR 652 or AWGR 654). Each AWGR can be coupled to a set of memory channels, and a processing unit can access a particular memory bank in a particular set of memory channels by tuning a microring in a corresponding column. This way, the number of memory channels accessible to the processing units can be doubled. For example, there can be n processing units accessing 2n memory channels of n banks using two n×n AWGRs.

In the examples shown in FIGS. 6A-6B, a bank conflict occurs if and only if more than one transmitter (microring) on the same row is tuned to the same wavelength (i.e., different processing units are requesting the same bank). As discussed previously, an arbiter in the memory controller can perform arbitration to ensure that at any given time there is no more than one microring in the same row tuned to the same wavelength, thus preventing the occurrence of bank conflict. In alternative embodiments, the processing units may communicate with each other to ensure that they do not tune their transmitters in the same row to the same wavelength.

Figure 7A:
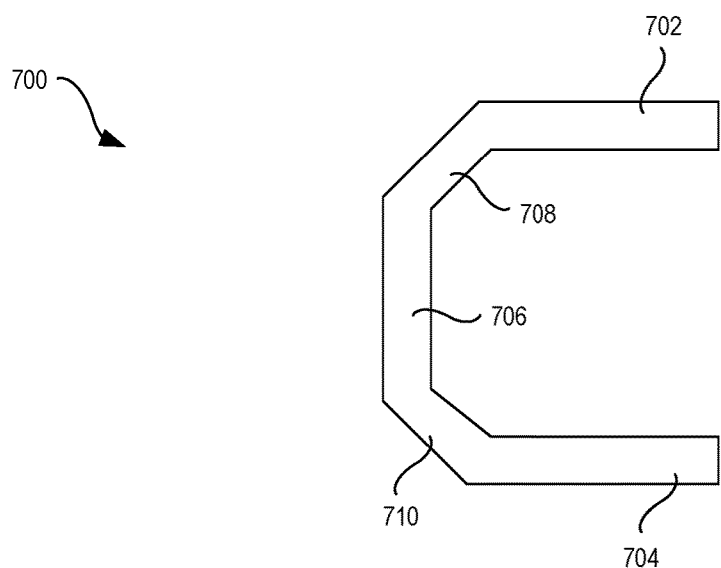
FIG. 7A illustrates an exemplary vertical U-turn silicon photonic device, according to one embodiment.

FIG. 7A illustrates an exemplary vertical U-turn SiPh device, according to one embodiment. Vertical U-turn SiPh device 700 can include two in-plane segments 702 and 704 and a vertical segment (or vertical via) 706. Note that the term "in-plane" used here refers to the orientation that is parallel to the surface of the wafer, whereas the term "vertical" refers to the direction that is perpendicular to the surface of the wafer. Vertical U-turn SiPh device 700 also includes a pair of 45° reflectors coupling the in-plane segments and the vertical segment. For example, 45° reflector 708 couples in-plane segment 702 and vertical segment 706, and 45° reflector 710 couples in-plane segment 704 and vertical segment 706. The coupling loss between the segments can be low. The in-plane segments of U-turn SiPh device 700 are in fact SiPh waveguides, and the vertical segments is referred to as the through-silicon optical via (TSOV). Compared with conventional TSVs, the TSOV has a smaller pitch size (e.g., 2 µm vs. 20 µm) and can provide a higher bandwidth density (optical vs. electrical). Vertical U-turn SiPh device 700 can be the basis building block for forming a vertical optical interconnect (VOI) that can move optical signals across vertically stacked Si wafers.

Figure 7B:
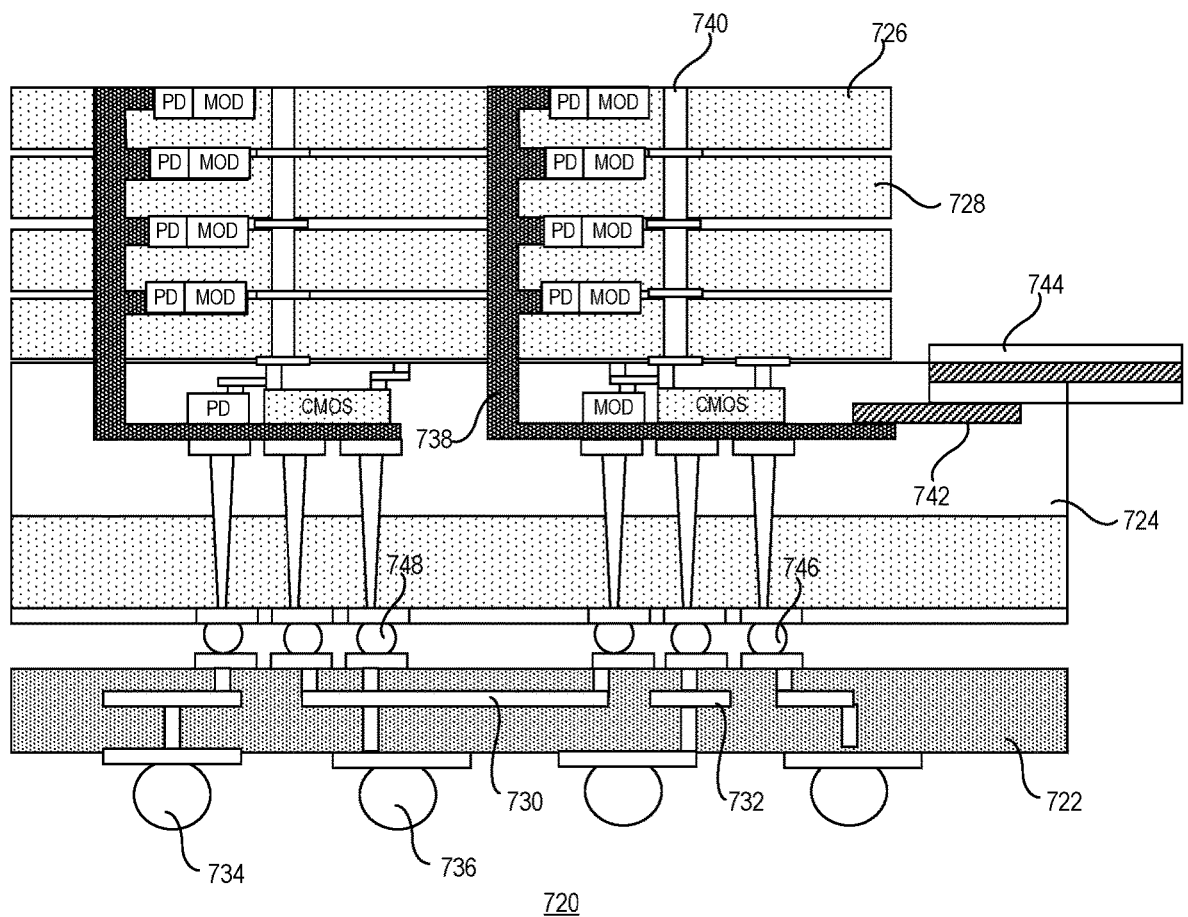
FIG. 7B illustrates the cross-sectional view of a 3D stacked memory die, according to one embodiment.

FIG. 7B illustrates the cross-sectional view of a 3D stacked memory die, according to one embodiment. A 3D stacked memory die 720 can include an interposer layer 722, a silicon photonic (SiPh) waveguide layer 724, and a number of SiPh DRAM layers (e.g., DRAM layers 726 and 728). Interposer layer 722 can include a plurality of embedded metal traces (e.g., traces 730 and 732) for facilitating electrical interconnections between memory die 720 and other co-packaged modules (e.g., AWGR and processing units) via a number of solder bumps (e.g., bumps 734 and 736). In one embodiment, interposer layer 722 can include an organic interposer, a Si interposer, or a $SiO_2$ interposer.

Each SiPh DRAM layer can include one or more memory channels. A memory channel can include a plurality of memory banks, and each memory bank can include its own SiPh transceivers (e.g., photodiodes and modulators). FIG. 7B also shows that multiple U-turn SiPh devices can form a VOI to allow data to be moved between memory banks in different SiPh DRAM layers vertically. The VOI can include a plurality of TSOVs (TSOV 738) and a plurality of SiPh waveguides (which can be the in-plane segments shown in FIG. 7A). Similar to what is shown in FIG. 7A, a U-turn SiPh device can be formed using a TSOV and a pair of in-plane SiPh waveguides. In some embodiments, the TSOVs can include Si-based waveguides. Conventional TSVs (e.g., TSV 740) provide inter-layer electrical connections.

SiPh waveguide layer 724 can include a number of optical waveguides (e.g., waveguide 742) coupled to the TSOVs. In some embodiments, SiPh waveguide layer 724 can include $SiO_2$, and the optical waveguides can be based on SiN or polymer. The optical waveguides can be coupled to a number of optical fibers to facilitate coupling between the memory die and an AWGR. For example, waveguide 742 is coupled to an optical fiber 744, which can be coupled to a port of the AWGR (not shown in FIG. 7B). Controlled collapse chip connection (C4) bumps (e.g., bumps can be used to bond waveguide layer 724 to interposer layer 722

In some embodiments, the memory node (which can include 3D stacked memory dies), the optical interconnect (i.e., the AWGR), and the processor node chiplet (which may include a number of processing units) can be packaged together on the same packaging substrate, and intra-package communication can be achieved using integrated SiPh interconnects. A processor node chiplet can include SERDES, SiPh transceivers (e.g., microring-based tunable transceivers), and compute core dies. The SiPh transceivers are connected to the processor chiplets through Si bridges (which are ideal for short-distance electrical interconnection) and optically to the AWGR through optical waveguides (e.g., SiN or polymer waveguides). A memory node can include embedded SiPh transceivers and can use SiN or polymer waveguides to connect to the AWGR. Note that the polymer or SiN waveguides are integrated on top of the packaging substrate (e.g., an organic substrate) and provide connectivity to the AWGR. SiPh is ideal for long-distance, inter-package communication, enabling this system to scale out to multiple packages. The multipackage system uses polymer or Si waveguides for interconnecting separate packages for computing cores, AWGR, and memory stacks without performance and energy degradation.

LLM Advantages

Compared with other memory technologies (e.g., DRAM, HBM, SALP, etc.), LLM provides a dedicated data bus (i.e., a wavelength-based data bus) for each memory bank, thus removing the contention on the data bus and increasing the degree of parallelism. Simulation results have shown that the LLM system can provide lower latency and higher bandwidth compared with an HBM system with the same number of banks. More specifically, LLM can achieve nearly the same throughput with random traffic as with streaming traffic.

Because LLM uses fine-grained memory banks (i.e., microbanks), the number of microbanks increases, thus reducing the likelihood of bank conflict. In addition, splitting microbanks into sub-microbanks reduces the length of the global bitlines, thus reducing the activation energy and allowing for more parallel accesses. To compare the level of parallelism between LLM and HBM, simulations have been conducted for a hypothetical case where both memories have an infinite number of banks per channel. The simulation result demonstrated that, assuming a random traffic pattern, the LLM can provide lower memory-access latency and higher bandwidth.

The LLM memory controller provides dedicated command queues for processing units (one queue for each processing unit), which can significantly increase the bandwidth utilization for multicore systems. In cases where there is no bank conflict, all processor cores can be serviced at approximately the same rate. As discussed previously, bank conflict can be resolved at the memory controller through arbitration. Simulations have shown that compared with a system implementing conventional memory controllers, an LLM system implementing memory controllers with processor-specific command queues can achieve a higher bandwidth. Moreover, the LLM memory controller implements a closed-page policy to increase determinism (i.e., having more deterministic memory-access time). Simulations have shown that, compared with other memory technologies, LLM can achieve significantly lower and more predictable latency.

In addition to reduced latency and increased bandwidth, LLM systems also consume less energy than conventional systems. DRAM access energy includes activation energy, data movement energy, and I/O energy. The activation energy directly depends on the number of bits in a row that are activated. LLM reduces the size of the row and consequently reduces the activation energy. Pre-GSA energy is the energy of moving data from local and master bitlines to the global row buffer, and it depends on the length of the bitlines. Since the length of the global bitlines is reduced in the LLM system, this energy will also be reduced. LLM uses optical links to move data between microbanks and processing units. Therefore, both the I/O and post-global sense amplifier energy values are equal and are independent of the laser, SERDES, and modulation circuitry. The total I/O energy (including the laser, SERDES, modulation circuitry) of the LLM system can be smaller than the I/O energy of conventional DRAMs.

In general, the disclosed embodiments provide a computer system with codesigned memory microarchitecture, memory controller, and processor-memory interconnect. The processor-memory interconnect can include an AWGR for providing all-to-all connections between processing units and memory banks. The wavelength-based signal routing provided by the AWGR can allow the processing units to access memory banks using dedicated optical data paths, thus increasing the bank-level parallelism and eliminating bus conflict. The codesigned memory controller can provide processor-specific command queues to increase throughput. The memory microarchitecture has been redesigned to reduce the access energy per bit by reducing the length of the global bitlines and by using smaller row buffers. LLM exhibits low memory-access latency for traffic with both regular and irregular access patterns. LLM can also achieve a lower memory latency variation by reducing queuing on the data path. Integrated SiPh components, such as microring resonators, AWGR, and TSOV, have been used to construct an integrated system-on-chip, with the memory stacks, AWGR, and processing cores integrated on the same package substrate.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer system, comprising:
   a plurality of processing units, wherein a respective processing unit is coupled to an array of tunable optical transceivers;
   a plurality of memory channels, wherein a respective memory channel is coupled to a plurality of memory banks, wherein each memory bank is associated with a unique optical wavelength and can be accessed via the corresponding wavelength; and
   an arrayed waveguide grating router (AWGR) coupling the tunable optical transceivers and the memory channels,
   wherein each memory channel is coupled to a different output port of the AWGR, and wherein the tunable optical transceivers of each processing unit are respectively coupled to different input ports of the AWGR, thereby allowing each processing unit to communicate with any memory bank associated with any memory channel using an appropriate tunable optical transceiver tuned to the corresponding optical wavelength associated with the memory bank.

2. The computer system of claim 1, further comprising a memory controller configured to coordinate communication between the processing units and memory banks associated with the memory channel, wherein the memory controller comprises a plurality of processor-specific command queues, and wherein a respective processor-specific command queue is configured to queue memory-access commands from a corresponding processing unit.

3. The computer system of claim 2, wherein the memory controller further comprises arbitration circuitry configured to select, from the processor-specific command queues, a memory-access command to be serviced.

4. The computer system of claim 3, wherein the selected memory-access command specifies a memory channel address and a memory bank address, wherein the memory channel address indicates an AWGR port to which the memory channel is coupled, and wherein the memory bank address indicates a wavelength by which the memory bank can be accessed.

5. The computer system of claim 4, wherein the arbitration circuitry is further configured to send an acknowledgment message to the processing unit for which the memory-access command is selected, and wherein the processing unit is configured to select the transceiver and wavelength based on the memory channel address and the memory bank address associated with the memory-access command.

6. The computer system of claim 5, wherein the processing unit is further configured to tune the determined transceiver to the selected wavelength and access a memory bank corresponding to the selected memory-access command using the tuned transceiver.

7. The computer system of claim 2, further comprising an electrical interconnect coupling the processing units and memory controllers for the memory channels.

8. The computer system of claim 1, wherein the array of tunable optical transceivers comprises a comb generator and an array of microring resonators.

9. The computer system of claim 1, wherein each memory bank comprises an optical transceiver operating at the corresponding optical wavelength.

10. The computer system of claim 1, wherein each memory bank further comprises at least two sub-banks, thereby further improving memory-access parallelism.

11. The computer system of claim 1, wherein the processing units are stacked to form a multi-processor stack comprising multiple processor layers, wherein transceivers associated with multiple processor layers are coupled to a same port of the AWGR using a through-silicon optical via (TSOV).

12. The computer system of claim 1, wherein the memory channels are coupled to memory dies that are stacked and interconnected using TSOVs and through-silicon vias (TSVs).

13. The computer system of claim 1, wherein the processing units, the memory channels, and the AWGR are packaged on a common substrate.

14. A memory-access method, the method comprising:
   sending, by a processing unit, a memory-access command to a memory-control-plane interconnect coupling a plurality of processing units and a plurality of memory banks, wherein multiple memory banks are coupled to a memory channel, wherein each memory bank is associated with and accessible via an optical signal transmitted on the corresponding memory channel at a unique optical wavelength, and wherein the memory-access command specifies a memory channel address and a memory bank address of a target memory bank, thereby allowing the memory-control-plane interconnect to forward the memory-access command to a memory controller associated with the target memory bank;
   selecting, by the processing unit, from an array of tunable optical transceivers coupled to the processing unit, a tunable optical transceiver based on the memory channel address and the memory bank address, wherein the array of tunable optical transceivers are respectively coupled to different input ports of an arrayed waveguide grating router (AWGR), and wherein different output ports of the AWGR are coupled to different memory channels;
   tuning the selected tunable optical transceiver to a wavelength corresponding to the target memory bank; and communicating with the target memory bank using the tuned optical transceiver via the AWGR.

15. The method of claim 14, wherein the memory-control-plane interconnect comprises an electrical interconnect.

16. The method of claim 14, further comprising:
queuing, at the memory controller, the memory-access command in a processor-specific queue.

17. The method of claim 16, further comprising:
performing, by the memory controller, arbitration among multiple processor-specific queues to select the memory-access command for service.

18. The method of claim 16, further comprising:
receiving, by a processing unit, an acknowledgment message from the memory controller subsequent to the memory controller selecting the memory-access command.

19. The method of claim 14, wherein tuning the determined tunable optical transceiver comprises tuning a corresponding microring resonator.

20. The method of claim 19, further comprising delaying, by the memory controller, activation of a requested row in the target memory bank to provide the tunable optical transceiver sufficient time to tune the microring resonator.

* * * * *